United States Patent
Ting et al.

(10) Patent No.: US 7,915,850 B2
(45) Date of Patent: Mar. 29, 2011

(54) APPARATUS AND METHOD FOR CONTROLLING SERVOMOTOR OF ELECTRIC INJECTION MOLDING MACHINE

(75) Inventors: Chin-Hsien Ting, Taipei Hsien (TW); Rong-Hwang Horng, Taipei Hsien (TW); Yaw-Shen Lai, Taipei Hsien (TW); Hsing-Chang Liu, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 380 days.

(21) Appl. No.: 12/132,060

(22) Filed: Jun. 3, 2008

(65) Prior Publication Data
US 2009/0220628 A1 Sep. 3, 2009

(30) Foreign Application Priority Data
Feb. 29, 2008 (CN) .......................... 2008 1 0300446

(51) Int. Cl.
*G05B 11/32* (2006.01)
(52) U.S. Cl. .................. 318/625; 318/568.22; 318/560; 318/66; 318/67; 318/68
(58) Field of Classification Search .................. 318/625, 318/560, 568.22, 52, 66–69
See application file for complete search history.

(56) References Cited

U.S. PATENT DOCUMENTS

| | | | | |
|---|---|---|---|---|
| 5,362,222 A | * | 11/1994 | Faig et al. | 425/145 |
| 6,046,566 A | * | 4/2000 | Sonoda et al. | 318/625 |
| 6,142,760 A | * | 11/2000 | Niizeki et al. | 425/145 |
| 7,144,238 B2 | * | 12/2006 | Chao | 425/145 |

* cited by examiner

*Primary Examiner* — Walter Benson
*Assistant Examiner* — David S Luo
(74) *Attorney, Agent, or Firm* — D. Austin Bonderer

(57) ABSTRACT

An apparatus and method for servomotors of an electric injection molding machine includes a motion controlling unit, two driving amplifying units, and two servomotors respectively connected to the driving amplifying units. The motion controlling unit includes two servomotor position controllers both for receiving a first position command, and the driving amplifying units are respectively connected to the servomotor position controllers for receiving a second and third position command. Two position detectors are respectively received in the two screw caps that are mounted to the servomotors for detecting absolute positions of the corresponding screw caps. The screw caps are respectively connected to inputs of the first and second servomotor position controllers to form two screw cap position feedback circuits. The values of the screw cap position feedback circuits are compared to the first position command for being input into the driving amplifying units to drive the corresponding servomotors to act synchronously.

9 Claims, 3 Drawing Sheets

APPARATUS AND METHOD FOR CONTROLLING SERVOMOTOR OF ELECTRIC INJECTION MOLDING MACHINE

BACKGROUND

1. Field of the Invention

The present invention relates to apparatuses for controlling servomotors of electric injection molding machines. The invention particularly relates to an apparatus that provides synchronous control for several servomotors of an electric injection molding machine.

2. Description of Related Art

In general, an electric injection molding machine includes one servomotor for driving the electric injection molding machine to inject melted resin. As the size of the electric injection molding machine becomes larger, greater efficiency of the servomotor is required as well. Thus, other electric injection molding machines use multiple synchronous servomotors. Referring to FIG. 1, a control apparatus 10 of an electric injection molding machine is provided for controlling at least two servomotors 31, 32, according to the prior art. The servomotors 31, 32 drive two mastering members 310, 320 respectively. The mastering member 310 includes a ball screw 314 and a screw cap 312. The mastering member 320 includes a ball screw 324 and a screw cap 322. The screw caps 312, 322 are connected by a rigid member 33. An injection screw 34 is mounted to the rigid member 33. The control apparatus 10 simultaneously outputs two signals to the servomotors 31, 32, for synchronously driving the ball screws 314, 324 and the rigid member 33 to move. The injection screw 34 is driven to a tube 35 coupled with the injection screw 34 to inject melted resin into a cavity 36. However, it is difficult for the servomotors 31, 32 to act synchronously.

What is needed, therefore, is to provide a better apparatus for applying synchronous servomotors of an electric injection molding machine to improve an accuracy of the electric injection molding machine.

SUMMARY

An exemplary apparatus and method for controlling servomotors of an electric injection molding machine includes a motion controlling unit, a first driving amplifying unit connected to the motion controlling unit, a second driving amplifying unit connected to the motion controlling unit, and first and second servomotors respectively connected to the first and second driving amplifying units. The motion controlling unit includes a position order generator for outputting a first position command, a first servomotor position controller, and a second servomotor position controller respectively connected to the position order generator for receiving the first position command. An input of the first driving amplifying unit is connected to an output of the first servomotor position controller and receives a second position command. An input of the second driving amplifying units is connected to an output of the second servomotor position controller for receiving a third position command. Two screw caps are respectively mounted to ball screws of the first and second servomotors, and a rigid member for mounting an injection screw is connected to the screw caps. Two position detectors are respectively received in the screw caps for detecting absolute positions of the corresponding screw caps. The screw caps are respectively connected to inputs of the first and second servomotor position controllers to form a first screw cap position feedback circuit and a second screw cap position feedback circuit. The first screw cap position feedback circuit determines the position of the first screw cap. The position determined by the first screw cap feedback position circuit is compared to the first position command to obtain a first original command. The first original command is input into the first servomotor position controller and the first servomotor position controller causes an adjustment as necessary. The adjustment is the second position command input into the first driving amplifying unit to drive the first servomotor. The second screw cap position feedback circuit determines the position of the second screw cap. The position determined by the second screw cap feedback position circuit is compared to the first position command to obtain a second original command. The second original command is input into the second servomotor position controller and the second servomotor position controller causes an adjustment as necessary The adjustment is the third position command input into the second driving amplifying unit to drive the second servomotor.

Other advantages and novel features will become more apparent from the following detailed description when taken in conjunction with the accompanying drawings, in which:

DETAILED DESCRIPTION

Figure 1:
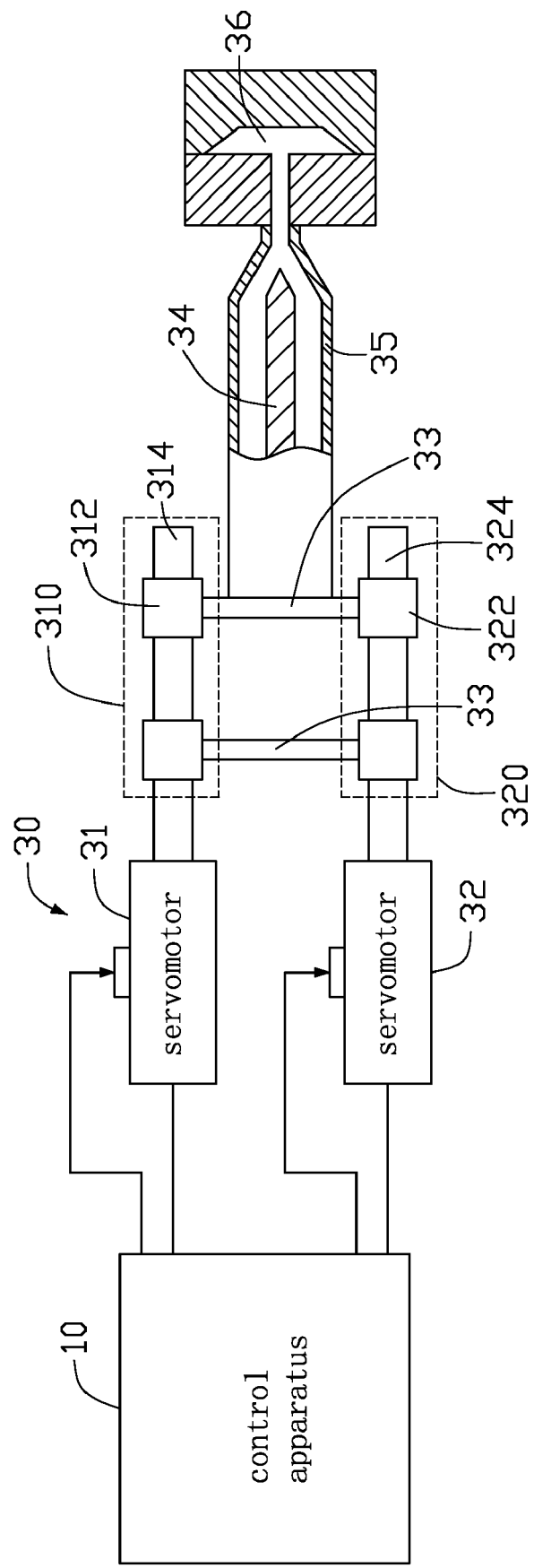
FIG. 1 is a schematic diagram of a prior art conventional electric injection molding machine according to the prior art.
Figure 2:
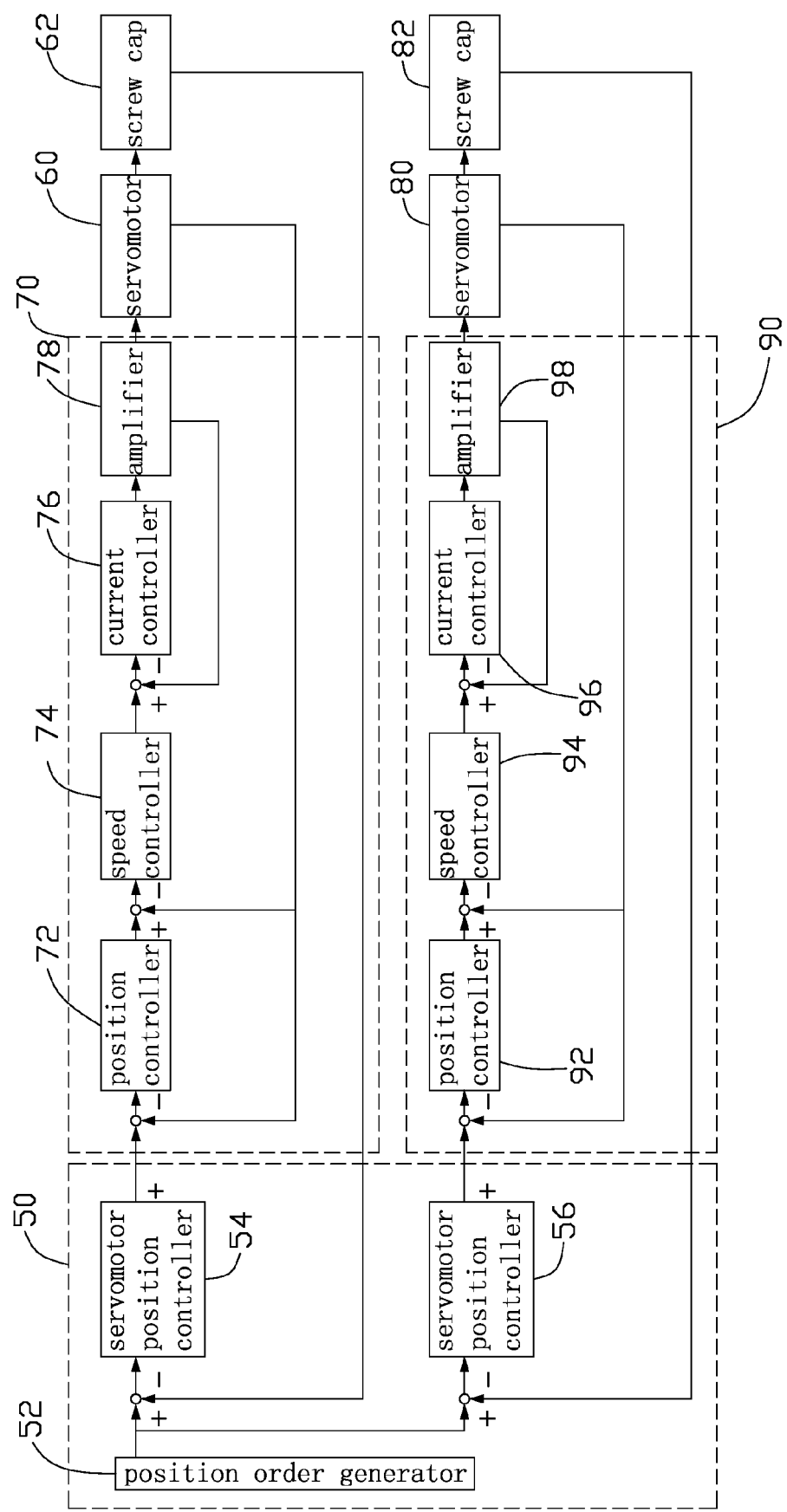
FIG. 2 is a block diagram of an apparatus and method for controlling servomotors of an electric injection molding machine in accordance with a first embodiment of the present invention.

Referring to FIG. 2, an apparatus and method for controlling servomotors of an electric injection molding machine in accordance with a first embodiment of the present invention includes a motion controlling unit 50, a first and second driving amplifying units 70, 90, and two servomotors 60, 80. The first and second driving amplifying units 70, 90 are both connected to the motion controlling unit 50. The two servomotors 60, 80 are respectively connected to the first driving amplifying unit 70 and the second driving amplifying unit 90.

Two screw caps 62, 82 are respectively mounted to ball screws (not shown) of the servomotors 60, 80. A rigid member for mounting an injection screw is connected between the screw caps 62, 82. Two position detectors (not shown) are respectively received in the screw caps 62, 82, for detecting absolute positions of the corresponding screw caps 62, 82. Moreover, each of the position detectors can also be mounted to any part of the electric injection molding machine as long as they can detect the absolute positions of the corresponding screw caps 62, 82.

The motion controlling unit 50 includes a position order generator 52, a first servomotor position controller 54 and a second servomotor position controller 56. The position order generator 52 is capable of producing a first position command and both the first and second servomotor position controllers' inputs are in communication the position order generator's output for receiving the first position command. The first position command is adjusted in the first servomotor position controller 54 to form a second position command outputted from the first servomotor position controller 54. The first position command is adjusted in the second servomotor position controller 56 to form a third position command outputted from the second servomotor position controller 56.

The first driving amplifying unit 70 includes a first position controller 72, a first speed controller 74, a first current controller 76 and a first amplifier 78. The first position controller's input is connected to the first servomotor position controller's output The first speed controller's input is connected to first position controller's output. The first current controller's input is connected to the first speed controller's output. The first amplifier's input is connected to the first current controller's output. The first amplifier's output is connected to the servomotor 60.

The amplifier 78 is also connected to the first current controller's input to form a first current feedback circuit. The servomotor 60 is connected to the first speed controller's input to form a first speed feedback circuit, and the servomotor 60 is also connected to the first position controller's input to form a first servomotor position feedback circuit. The screw cap 62 is connected to the first servomotor position controller's input to form a first screw cap position feedback circuit, and the first screw cap position feedback circuit is used for sending a first value of screw position feedback to the first servomotor position controller 54. The second position command and the value of screw position feedback are combined to input into the first driving amplifying unit 70 to drive the ball screw connected to the servomotor 60. Thus, the screw cap 62 is driven to more precisely position thereof, in order to ensure an accuracy of the electric injection molding machine.

The second driving amplifying unit 90 includes a second position controller 92, a second speed controller 94, a second current controller 96 and a second amplifier 98. The second position controller's input is connected to the second servomotor position controller's output. The second speed controller's input is connected to the second position controller's output. The second current controller's is connected to the second controller's output. The second amplifier's input is connected to the second current controller's output. The second amplifier's output is connected to the servomotor 80.

The second amplifier 98 is also connected to the second current controller's input to form a second current feedback circuit. The servomotor 80 is connected to the second speed controller's input to form a second speed feedback circuit, and the servomotor 80 is also connected to the second position controller's input to form a second servomotor position feedback circuit. The screw cap 82 is connected to the second servomotor position controller's input to form a second screw cap position feedback circuit, and the second screw cap position feedback circuit is used for sending a second value of screw position feedback to the second servomotor position controller 56. The third position command and the second value of screw position feedback are combined to input into the second driving amplifying unit 90 to drive the ball screw connected to the servomotor 80. Thus, the screw cap 82 is driven to more precisely position thereof, in order to ensure an accuracy of the electric injection molding machine.

In use, the first position command can control the actions of the injection screw over time according to a predetermined injection speed. The first position command controls the servomotor 60 to move via the motion controlling unit 50 and the first driving amplifying unit 70. Thus, the ball screw is driven to move by its servomotor 60. The position detector detects a position of the screw cap 62 and feeds a value of screw position feedback to the first servomotor position controller 54 via the first screw cap position feedback circuit. The value of the first screw position feedback is subtracted from the first position command to obtain a first original command. The first original command is input into the first servomotor position controller 54 to be adjusted, thereby becoming the second command for the first driving amplifying units 70. A value of the first servomotor position feedback is subtracted from the second position command to a first position signal. The first position signal is input into the first position controller 72 to be adjusted, thereby becoming a speed command for the first speed controller 74. A value of the first speed feedback circuit is calculated by time derivative to obtain a speed feedback value. The speed feedback value is subtracted from the speed command to obtain a first speed signal. The first speed signal is input into the first speed controller 74 to be adjusted, thereby becoming a current command for the first current controller 76. A value of the first current feedback circuit is subtracted from the current command to obtain a first current signal. The first current signal is input into the first current controller 76 to be adjusted to obtain a first final command. The first final command output from the first current controller 76 is input into the first amplifier 78 to be amplified to obtain a first amplified command. The first amplified command output from the first amplifier 78 is input into the servomotor 60 for driving the servomotor 60.

The first position command further controls the servomotor 80 to synchronously move together with the servomotor 60. The first position command is input into the second servomotor position controller 56 to be adjusted to form the third position command. The third position command is input into the motion controlling unit 50 and the second driving amplifying unit 90 in turn, and then is output from the second amplifier 78 for driving the servomotor 60 with its ball screw together. Specified operation of the third position command in the second driving amplifying unit 90 is similar with the second position command in the first driving amplifying unit 70.

Figure 3:
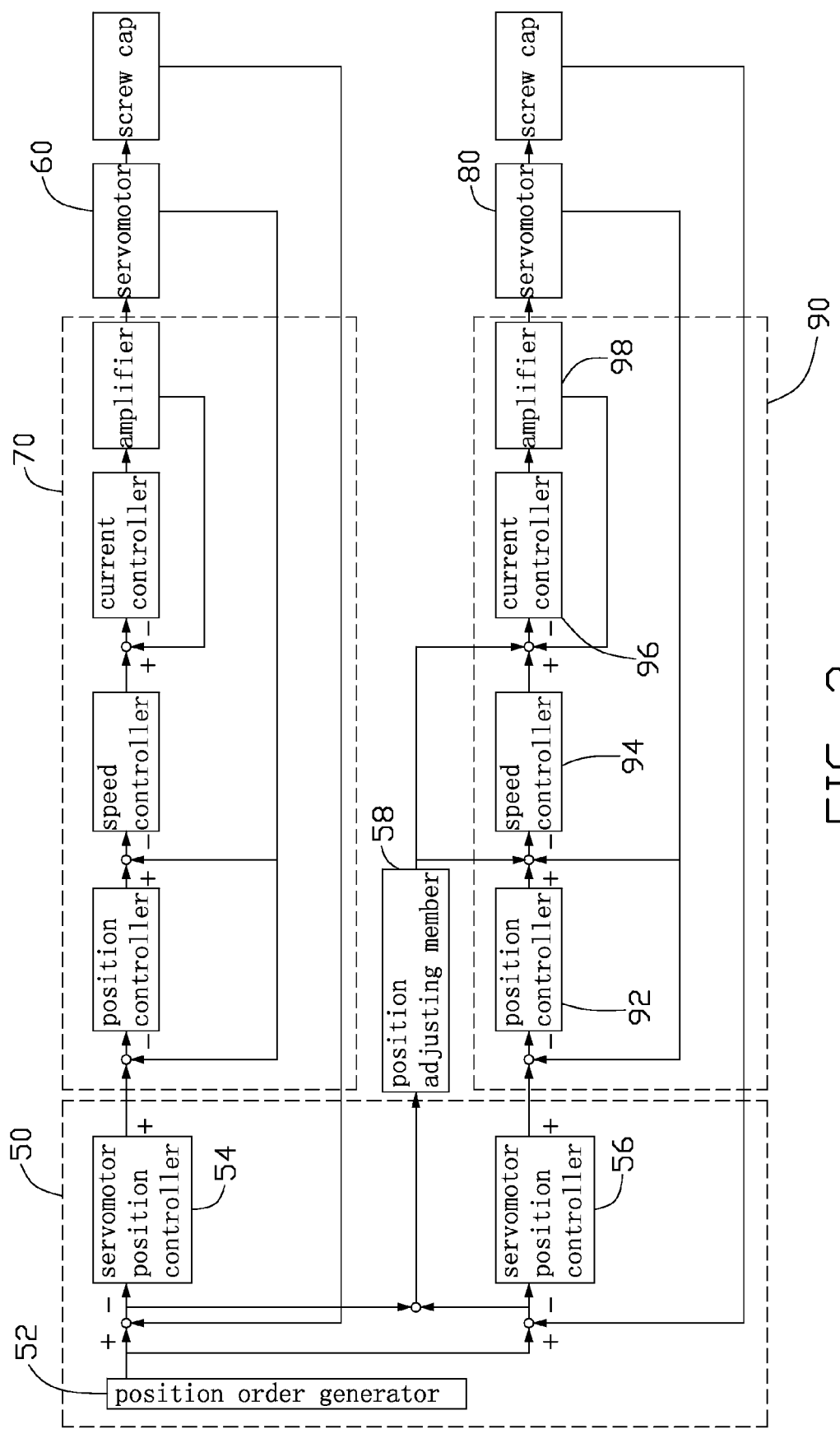
FIG. 3 is a block diagram of an apparatus and method for controlling servomotors of an electric injection molding machine in accordance with a second embodiment of the present invention.

Referring to FIG. 3, which is an apparatus and method for controlling servomotors of an electric injection molding machine in accordance with a second embodiment of the present invention. The second embodiment includes a motion controlling unit 50. The first and second driving amplifying units 70, 90, are both connected to the motion controlling unit 50, and the two servomotors 60, 80 are respectively connected to the first and second driving amplifying units 70, 90. The second embodiment is similar to the first embodiment, but in the second embodiment, the control apparatus for servomotors of an electric injection molding machine further includes a position adjusting member 58. The position adjusting member's input is simultaneously connected to the first and second servomotor position controllers' inputs. The position adjusting member's output is simultaneously connected to the second speed controller's input and the second current controller's input of the second driving amplifying unit 90.

In use, the first position command can control the actions of the injection screw over time according to a predetermined injection speed. The first position command controls the servomotors 60, 80, to move via the motion controlling unit 50, and the corresponding first and second driving amplifying units 70, 90. Thus, ball screws connected to and driven by the servomotors 60, 80. A value of the first screw cap position feedback circuit is subtracted from the first position command to form a first error. A value of the second screw cap position feedback circuit is subtracted from the first position command to form a second error. The first error is subtracted from the second error to form an adjusting command for adjusting the servomotor 80 to be driven to synchronously move with the servomotor 60. The adjusting command is input into the position adjusting member 58 to be adjusted, and then becomes a compensating value of a rotational speed for the second driving amplifying unit 90.

The compensating value of the rotational speed is combined with a current command output from the second position controller 92, and time derivative of a value of the second speed feedback to input into the second speed controller 94. The second speed controller 94 adjusts the rotational speed of the servomotor 80. The compensating value of the rotational speed output from the position adjusting member 58 is adjusted by a function of $K(x)+K(v)/dt$ to obtain a compensating value of torque, and then is input into the second current controller 96. The compensating value of torque is compared to the second speed feedback value and calculated to obtain a second speed signal. The second speed signal output from the second speed controller 94 for controlling the servomotor 80 to act simultaneously with the servomotor 60.

In other embodiments of the invention, additional sets of servomotor position controllers and driving amplifying units are used. Thus an embodiment could be used to control three or more servomotors.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. An apparatus comprising:
   a motion controlling unit comprising:
      a position order generator capable of outputting a first position command;
      a first servomotor position controller and a second servomotor position controller, both servomotor position controllers are connected to the position order generator for receiving the first position command;
   a first driving amplifying unit connected to the first servomotor position controller, wherein the first driving amplifying unit is configured to receive a second position command from the first servomotor position controller, and the first driving amplifying unit comprises a first position controller connected to the first servomotor position controller;
   a second driving amplifying unit connected to the second servomotor position controller, wherein the second driving amplifying unit is configured to receive a third position command from the second servomotor position controller, and the second driving amplifying unit comprises a second position controller connected to the second servomotor position controller; and
   a first servomotor and a second servomotor connected to the first and second driving amplifying units respectively, wherein the first servomotor is connected to the first position controller to form a first servomotor position feedback circuit, and the second servomotor is connected to the second position controller to form a second servomotor position feedback circuit;
   a first screw cap and a second screw cap respectively mounted to ball screws of the first and second servomotors;
   a mounting element for mounting an injection screw connected to the screw caps;
   first and second position detectors are associated with the screw caps capable of detecting absolute positions of the corresponding screw caps, the first and second screw caps connected to the first and second servomotor position controllers respectively to form a first and a second screw cap position feedback circuits.

2. The apparatus as claimed in claim 1, wherein the first driving amplifying unit further comprises:
   a first speed controller connected to the first position controller;
   a first current controller connected to the first speed controller; and
   a first amplifier connected to the first current controller;
   wherein the amplifier is connected to the first servomotor and to the first current controller to form a first current feedback circuit; and the first servomotor is connected to the first speed controller to form a first speed feedback circuit.

3. The apparatus as claimed in claim 1, wherein the second driving amplifying unit further comprises:
   a second speed controller connected to the second position controller;
   a second current controller connected to the second speed controller; and
   a second amplifier connected to the second current controller;
   wherein the second amplifier is connected to the second servomotor; the second amplifier is connected to the second current controller to form a second current feedback circuit; and the second servomotor is connected to the second speed controller to form a second speed feedback circuit.

4. The apparatus as claimed in claim 3, wherein the motion controlling unit further comprises a position adjusting member connected to the first and second servomotor position controllers;
   the position adjusting member is connected to the second speed controller and the second current controller;
   the first screw cap position feedback circuit is capable of determining the position of the first screw cap by subtracting a value of the first screw cap feedback position circuit from a value of the first position command to obtain a first error;
   the second screw cap position feedback circuit is capable of determining the position of the second screw cap by subtracting a value of the second screw cap feedback position circuit from a value of the second position command to obtain a second error;
   the position adjusting member is capable of receiving the first and second errors for adjusting the first and second servomotors to be driven to act synchronously.

5. A method for controlling servomotors of an electric injection molding machine comprising:
   providing a control apparatus comprising a motion controlling unit, a first driving amplifying unit, a second driving amplifying unit, a first servomotor, and a second servomotor;
   the motion controlling unit comprising a position order generator, a first servomotor position controller and a second servomotor position controller both connected to the position order generator;
   the first and second servomotors respectively connected to the first and second driving amplifying units, each servomotor comprising a screw cap mounted to a corresponding ball screws of the first and second servomotors, the respective screw caps being connected to inputs of the first and second servomotor position controllers respectively to form a first and a second screw cap position feedback circuits;
   wherein a first position command is output from the position order generator to command the first and second servomotors to actuate their respective ball screws via the motion controlling unit and the corresponding first and second driving amplifying units;

the first screw cap position feedback circuit determines the position of the first screw cap, the position determined by the first screw cap feedback position circuit is compared to the first position command to obtain a first original command, the first original command is input into the first servomotor position controller and the first servomotor position controller causes an adjustment as necessary, the adjustment is a second position command input into the first driving amplifying unit to drive the first servomotor;

the second screw cap position feedback circuit determines the position of the second screw cap, the position determined by the second screw cap feedback position circuit is compared to the first position command to obtain a second original command, the second original command is input into the second servomotor position controller and the second servomotor position controller causes an adjustment as necessary, the adjustment is a third position command input into the second driving amplifying unit to drive the second servomotor.

6. The method as claimed in claim 5, wherein the first driving amplifier unit comprises a first position controller, a first speed controller, a first current controller, and a first amplifier;

a value of the first servomotor position feedback circuit is subtracted from the second position command to obtain a first position signal; the first position signal is inputted into the first position controller to be adjusted, thus becoming a speed command for the first speed controller;

a value of the first speed feedback circuit is calculated by time derivative to obtain a speed feedback value; the speed feedback value is subtracted from the speed command to obtain a first speed signal; the first speed signal is input into the first speed controller to be adjusted, thus becoming a current command for the first current controller;

a value of the first current feedback circuit is subtracted from the current command to obtain a first current signal; the first current signal is inputted into the first current controller to be adjusted to obtain a first final command;

the first final command output from the first current controller is input to the first amplifier to be amplified to obtain a first amplified;

the first amplified command output from the first amplifier is input into the first servomotor for driving the first servomotor.

7. The method as claimed in claim 5, wherein the second driving amplifier unit comprises a second position controller, a second speed controller, a second current controller and a second amplifier;

a value of the second servomotor position feedback circuit is subtracted from the third position command to obtain a second position signal, the second position signal is inputted into the second position controller to be adjusted, thus becoming a speed command for the second speed controller;

a value of the second speed feedback circuit is calculated by time derivative to obtain a speed feedback value; the speed feedback value is subtracted from the speed command to obtain a second speed signal, the second speed signal is input into the second speed controller to be adjusted, thus becoming a current command for the second current controller;

a value of the second current feedback circuit is subtracted from the current command to obtain a second current signal, the second current signal is input into the second current controller to be adjusted to obtain a second final command;

the second final command output from the second current controller is input to the second amplifier to be amplified to obtain a second amplified;

the second amplified command output from the second amplifier is input into the second servomotor for driving the second servomotor.

8. The method as claimed in claim 5, wherein the second driving amplifier unit comprises a second current controller and a second speed controller; and a control apparatus comprises a position adjusting member;

a value of the first screw cap position feedback circuit is subtracted from the first position command to form a first error;

a value of the second screw cap position feedback circuit is subtracted from the first position command to form a second error;

the first error is subtracted from the second error to form an adjusting command for adjusting the second servomotor to be driven to synchronously move with the first servomotor;

the adjusting command is input into the position adjusting member to be adjusted, thus becoming a compensating value of a rotational speed for the second driving amplifying unit.

9. The method as claimed in claim 8, wherein the compensating value of the rotational speed output from the position adjusting member is adjusted by a function of $K(x)+K(v)/dt$ to obtain a compensating value of torque;

the compensating value of torque is input into the second current controller;

the compensating value of torque is input into the second speed controller.

* * * * *